United States Patent [19]

Stournas

[11] 4,166,038
[45] Aug. 28, 1979

[54] SURFACTANT WATERFLOODING EMPLOYING AMPHOTERIC SULFONIUM SULFONATES

[75] Inventor: Stamoulis Stournas, Flemington, N.J.
[73] Assignee: Mobil Oil Corporation, New York, N.Y.
[21] Appl. No.: 865,767
[22] Filed: Dec. 29, 1977
[51] Int. Cl.$^2$ ............................................. E21B 43/22
[52] U.S. Cl. ............................... 252/8.55 D; 166/274; 166/275
[58] Field of Search ................... 252/8.55 D; 166/273, 166/274, 275

[56] References Cited

U.S. PATENT DOCUMENTS

| | | | |
|---|---|---|---|
| 2,813,898 | 11/1957 | Gaertner | 260/505 |
| 3,390,094 | 6/1966 | Diehl et al. | 252/535 |
| 3,469,630 | 9/1969 | Hurd et al. | 166/250 |
| 3,939,911 | 2/1976 | Maddox et al. | 166/274 |
| 3,977,471 | 8/1976 | Gale et al. | 252/8.55 X |
| 4,076,743 | 2/1978 | Koch et al. | 252/8.55 X |

*Primary Examiner*—Herbert B. Guynn
*Attorney, Agent, or Firm*—C. A. Huggett; William D. Jackson

[57] ABSTRACT

Waterflood process for the recovery of oil from a subterranean oil reservoir involving injecting into the reservoir an aqueous solution of an amphoteric surfactant having an inner sulfonium group linked to a terminal sulfonate group. The amphoteric sulfonium sulfonate may be employed in relatively low concentrations within the range of 0.001–0.1 weight percent and injected in an aqueous slug of at least 0.5 pore volume. The invention may be applied in situations in which the reservoir waters and/or the waters employed in formulating the surfactant solution contain relatively high amounts of divalent metal ions. Specifically disclosed sulfonium sulfonates include dodecylmethylsulfonium propane sulfonate, tetradecylmethylsulfonium propane sulfonate, and hexadecylhydroxyethylsulfonium propane sulfonate.

24 Claims, No Drawings

SURFACTANT WATERFLOODING EMPLOYING AMPHOTERIC SULFONIUM SULFONATES

BACKGROUND OF THE INVENTION

This invention relates to the recovery of oil from subterranean oil reservoirs and more particularly to improved waterflooding operations involving the use of certain amphoteric surfactants which are suitable for use in brines containing relatively high concentrations of divalent metal ions.

In the recovery of oil from oil-bearing reservoirs, it usually is possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into the reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the flood water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Processes which involve the injection of aqueous surfactant solutions are commonly referred to as surfactant waterflooding or as low tension waterflooding, the latter term having reference to the mechanism involving the reduction of the oil-water interfacial tension. Thus far, many such waterflooding applications have employed anionic surfactants. For example, a paper by W. R. Foster entitled "A Low-Tension Waterflooding Process", Journal of Petroleum Technology, Vol. 25, Feb. 1973, pp. 205-210, describes a promising technique involving the injection of an aqueous solution of petroleum sulfonates within designated equivalent weight ranges and under controlled conditions of salinity. The petroleum sulfonate slug is followed by a thickened water slug which contains a viscosifier such as a water-soluble biopolymer in a graded concentration in order to provide a maximum viscosity greater than the viscosity of the reservoir oil and a terminal viscosity near that of water. This thickened water slug is then followed by a driving fluid such as a field brine which is injected as necessary to carry the process to conclusion.

One problem encountered in waterflooding with certain of the anionic surfactants such as the petroleum sulfonates is the lack of stability of these surfactants in so-called "high brine" environments. These surfactants tend to precipitate from solution in the presence of monovalent salts such as sodium chloride in concentrations in excess of about 2-3 weight percent and in the presence of much lower concentrations of divalent metal ions such as calcium and magnesium ions. Typically, divalent metal ion concentrations of about 50-100 ppm and above tend to cause precipitation of the petroleum sulfonates. The salinity of the surfactant slug is also significant with regard to interfacial tensions achieved through the use of petroleum sulfonates such as disclosed in the Foster paper. Even in the absence of divalent metal ions, optimum interfacial tensions are seldom achieved at salinities significantly in excess of 2-3 weight percent.

Various surfactant formulations which will tolerate high salinities and/or high divalent metal concentrations have been proposed for use in high brine environments. Thus, U.S. Pat. No. 3,939,911 to Maddox et al. discloses a surfactant waterflooding process employing a three-component surfactant system which tolerates polyvalent ion concentrations from about 200 to about 14,000 parts per million. The three-component surfactant system includes an alkyl or alkylaryl sulfonate such as an ammonium dodecyl benzene sulfonate, a phosphate ester sulfonate, and a sulfonated betaine such as $C_{12}$–$C_{24}$ alkyl amido $C_1$–$C_5$ alkane dimethylammonium propane sulfonate. The several surfactant components may be employed in concentrations from about 0.05% to about 5.0% and preferably about 0.2% to about 0.5% by weight. The surfactant system is said to be stable up to at least 225° F. and to be resistant to bacterial attack and inhibits scale formation.

SUMMARY OF THE INVENTION

In accordance with the present invention, there is provided a new and improved surfactant waterflooding process employing an amphoteric surfactant which is effective in reducing oil-water interfacial tensions in relatively saline aqueous media which include the presence of significant quantities of divalent metal ions. The invention is carried out in a subterranean oil reservoir penetrated by spaced injection and production systems. In carrying out the invention, at least a portion of the injected fluid comprises an aqueous liquid containing a water-soluble amphoteric surfactant characterized by the formula:

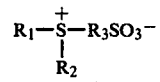

wherein:
  $R_1$ is a hydrocarbon group containing from 8 to 24 carbon atoms,
  $R_2$ is a hydrocarbon group containing from 1 to 4 carbon atoms or an alkoxy group containing from 2 to 10 carbon atoms and having a ratio of carbon atoms to oxygen atoms within the range of 2 to 3, and
  $R_3$ is an aliphatic group containing from 1 to 4 carbon atoms.

A preferred application of the present invention is in oil reservoirs in which the formation waters exhibit high salinities and/or divalent metal ion concentrations or in instances in which the available injection waters exhibit high salinities and/or divalent metal ion concentrations. Thus a preferred application is in cases where the formation waters or the injection waters, or both, contain divalent metal ions in concentrations of at least 0.1 weight percent.

In a preferred embodiment of the invention, the injected aqueous liquid contains the amphoteric surfactant in a relatively low concentration within the range of 0.001 to 0.1 weight percent and preferably is injected in a relatively large amount of at least 0.5 pore volume.

In a further embodiment of the invention, the amphoteric surfactant is a methylsulfonium or ethoxysulfonium propane sulfonate characterized by the formula:

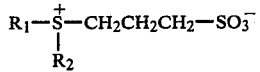

wherein:
$R_1$ is a hydrocarbon group containing from 10 to 18 carbon atoms, and
$R_2$ is $-CH_3$ or $-(CH_2CH_2O)_nH$ and n is a number within the range of 1 to 5.

DESCRIPTION OF SPECIFIC EMBODIMENTS

The present invention involves a process for the recovery of oil employing an amphoteric surfactant having an inner sulfonium group which is linked to a terminal sulfonate group. The electrical charge on the inner sulfonium group is electrically balanced by the terminal sulfonate group and such amphoteric surfactants may thus be characterized as dipolar ions or zwitter ions.

The lipophilic base of the surfactant is linked to the sulfonate group through the sulfonium group and is provided by one or two hydrocarbon groups. More specifically, the lipophilic base of the surfactant molecule may be provided by aliphatic groups or aliphatic-substituted aryl groups. Where an aliphatic-substituted aryl group is employed in providing the lipophilic base, the aryl component may be a mononuclear group or a condensed ring dinuclear group, e.g. benzene or naphthalene, and contains one or more aliphatic substituents. Preferably, the aryl component is mononuclear in view of the practical considerations of economy and product synthesis and is substituted with a $C_8-C_{16}$ aliphatic group. Where the aryl component is dinuclear, it is substituted with a $C_6-C_{14}$ aliphatic group, thus providing a total of from 16 to 24 carbon atoms.

The lipophilic base of the amphoteric surfactant may be conjugated in nature as in the case of the dioctylsulfonium and bisdecylsulfonium derivatives referred to hereinafter or it may be primarily monobasic as in the case of hexadecylhydroxyethylsulfonium propane sulfonate described hereinafter. In the latter case, the lipophilic base may be provided by an aliphatic-substituted aryl group as described previously or by a $C_8-C_{18}$ aliphatic group. In the case of the conjugated derivative, the lipophilic base may be provided by two similar or dissimilar hydrocarbon groups containing in combination a total number of carbon atoms within the range of 10-24 with one hydrocarbon group containing at least 6 carbon atoms and the other containing at least 4 carbon atoms. While one or both of the hydrocarbon groups may contain aliphatic-substituted aryl groups as described previously, it is preferred that the conjugated lipophilic base take the form of two aliphatic groups containing in combination a total number of from 10 to 20 carbon atoms. The aliphatic groups or aliphatic substituents employed in formulating the lipophilic base may be unsaturated and/or can contain branched chains but usually will take the form of normal alkyl or alkynyl radicals.

Amphoteric surfactants of the general type employed in carrying out the present invention are disclosed in U.S. Pat. No. 2,813,898 to Gaertner where they are said to be useful in biological toxicants, herbicides, and, in the case of aromatic sulfonium sulfonates substituted with a long chain alkyl group, as surface-active agents. U.S. Pat. No. 3,390,094 to Diehl et al. discloses a "cool water" laundry detergent formulation of an organic or inorganic alkaline builder salt and a dialkyl- or alkyl hydroxyalkylsulfonium sulfonate in which one alkyl group contains 12 to 16 carbon atoms. The detergent formulations said to give best cool water cleaning results contain dodecylmethylsulfonium propane sulfonate. As disclosed for example in the Gaertner patent, the amphoteric sulfonium sulfonates may be prepared by the reaction of a hydrocarbon sulfide with propane or butane sultone or by the reaction of a hydrocarbon mercaptoalkanesulfonate with a hydrocarbon sulfate. For a further description of such amphoteric sulfonium sulfonates and their methods of preparation, reference is made to the aforementioned patents to Gaertner and Diehl et al.

A class of amphoteric surfactants suitable for use in carrying out the invention may be characterized by the formula:

(1)

wherein:
$R_1$ is a hydrocarbon group containing from 8 to 24 carbon atoms,
$R_2$ is a hydrocarbon group containing from 1 to 4 carbon atoms or an alkoxy group containing from 2 to 10 carbon atoms and having a ratio of carbon atoms to oxygen atoms within the range of 2 to 3, and
$R_3$ is an aliphatic group containing from 1 to 4 carbon atoms.

The number of carbon atoms in the group $R_1$ may vary as indicated by formula (1) between 8 to 24, depending upon the nature of the group and also the group $R_2$. Where $R_1$ is an aliphatic group, it will normally contain from 8 to 18 carbon atoms. Where $R_1$ is an aliphatic-substituted aryl group, it normally will contain from 6 to 16 aliphatic carbon atoms and more specifically 8 to 16 aliphatic carbon atoms in the case of the mononuclear aryl derivative and 6 to 14 aliphatic carbon atoms in the case of the condensed ring dinuclear derivative.

$R_2$ is selected from the group consisting of $C_1-C_4$ hydrocarbon groups or $C_2-C_{10}$ alkoxy groups having a ratio of carbon atoms to oxygen atoms within the range of 2 to 3. Stated otherwise, where $R_2$ is an alkoxy group, it may be ethylene oxide, polyethylene oxide containing up to 5 ethylene oxide units, propylene oxide, polypropylene oxide containing up to 3 propylene oxide units, or oligomers of mixtures of ethylene oxide and propylene oxide containing no more than 10 carbon atoms. The nature of the group $R_2$ is, as noted previously, somewhat dependent upon the nature of the $R_1$ group. Where $R_1$ comprises a relatively long chain aliphatic substituent, $R_2$ normally will be relatively short chain hydrocarbon groups or ethylene oxide derivatives. For example, where $R_1$ is a $C_{14}$–$C_{18}$ aliphatic radical, $R_2$ normally will take the form of a methyl or ethyl group or a group comprising ethylene oxide, propylene oxide, or polyethylene oxide. Where $R_1$ is a lower molecular weight group and thus imparts less oil solubility to the molecule, $R_2$ may be somewhat more oil soluble to approach a molecular configuration in which the lipophilic base is conjugated in nature. The conjugated derivative may be characterized more specifically by the formula:

  (2)

wherein:
$R_1$ and $R_2$ are hydrocarbon groups containing at least 6 carbon atoms and at least 4 carbon atoms, respectively, and containing in combination a total number of carbon atoms within the range of 10 to 24, and
$R_3$ is an aliphatic group containing from 1 to 4 carbon atoms.

As noted previously, the conjugated lipophilic base preferably is provided by two aliphatic groups containing in combination a total number of carbon atoms within the range of 10 to 20. $R_1$ and $R_2$ may be similar as in the case of bis(hexyl)sulfonium propane sulfonate, dioctylsulfonium propane sulfonate, and bis(decyl)sulfonium propane sulfonate or they may be dissimilar. Examples of the latter include hexylbutylsulfonium propane sulfonate, octylbutylsulfonium propane sulfonate, and octylhexylsulfonium propane sulfonate. As noted previously, substituted aryl radicals may also be employed in providing the conjugated lipophilic base. Examples of derivatives of this type include butylbenzyl hexylsulfonium propane sulfonate and octylbenzyl butylsulfonium propane sulfonate. Preferably, however, the conjugated base is provided by two aliphatic groups and more preferably the total number of carbon atoms in the aliphatic groups range from 10 to 16.

As understood by those skilled in the art, surfactant molecules are characterized by an oil-soluble portion of the molecule which tends to partition into the oil phase of an oil-water interface and a water-soluble portion which tends to partition into the water phase. In the amphoteric surfactants employed in the present invention, the anionic sulfonate group is of course water soluble. In addition, the sulfonium group tends to impart water solubility to the surfactant molecule to a degree depending upon the characteristics of the groups $R_1$ and $R_2$, described previously. The greatest water solubility is observed when the lipophilic portion of the surfactant is primarily monobasic and the group $R_2$ is a methyl or ethyl radical or an ethylene oxide derivative and amphoteric surfactants of this molecular configuration are preferred in carrying out the invention. Examples of such amphoteric surfactants include octylethylsulfonium ethane sulfonate, decylethylsulfonium propane sulfonate, dodecylmethylsulfonium propane sulfonate, tetradecylhydroxyethylsulfonium ethane sulfonate, hexadecylhydroxyethylsulfonium propane sulfonate, and hexadecylpolyethoxysulfonium propane sulfonate. Further examples include nonylbenzylmethylsulfonium propane sulfonate, octyltolylethylsulfonium propane sulfonate, and dodecylbenzylpolyethoxysulfonium propane sulfonate.

The aliphatic linkage, $R_3$, between the sulfonium and sulfonate groups contains 1 to 4 carbon atoms. Where $R_3$ contains 2 or more carbon atoms, it may be saturated or unsaturated and straight or branched chained. The $R_3$ radical may also be substituted with a group such as a hydroxy group which tends to increase the water solubility of this portion of the surfactant molecule. Usually, however, the $R_3$ group will be an unsubstituted hydrocarbon radical. In a preferred embodiment of the invention, $R_3$ is an aliphatic group containing 2 or 3 carbon atoms. The derivatives wherein $R_3$ contains from 1 to 4 carbon atoms may be prepared by the aforementioned condensation reaction of a mercaptoalkanesulfonate with a hydrocarbon sulfate and those in which $R_3$ contains 3 or 4 carbon atoms may be prepared by reaction of the appropriate disulfide with propane sultone or butane sultone. Usually it will be preferred to effect sulfonation through the use of propane sultones since the addition reaction of the sultone with the sulfide is easily carried out under relatively moderate temperature conditions of about 100° C.

The salinity tolerance of the amphoteric sulfonium sulfonates employed in the present invention is indicated by brine stability experiments and oil-water interfacial tension measurements obtained during the course of laboratory work. The surfactants employed in the experimental work were synthesized by the addition reaction of 1,3-propane sultone with the appropriate organic sulfide. Thus, dodecylmethylsulfonium propane sulfonate was prepared by mixing 21.6 grams of dodecylmethyl sulfide with 12.2 grams of propane sultone and then heating the mixture at 100° C. for a period of about 1 hour until it had solidified. The solid dodecylmethylsulfonium propane sulfonate was recovered by an amount of 33.5 grams. Similar procedures were employed in preparing tetradecylmethylsulfonium propane sulfonate and hexadecylhydroxyethylsulfonium propane sulfonate by reaction of propane sultone with tetradecylmethyl sulfide and 2-hexadecylmercaptoethanol, respectively.

The brines employed in the brine stability experiments had salinities (total dissolved salts content) of 6.6 weight percent and 16.6 weight percent. The 6.6 percent brine contained 6.2 weight percent sodium chloride and 250 ppm magnesium ions, 1160 ppm calcium ions, and 90 ppm barium ions in the form of the chloride salts to provide a divalent metal ion content of 1500 ppm. The 16.6 percent brine contained 13.2 weight percent sodium chloride, 2.6 weight percent calcium chloride, and 0.8 weight percent magnesium chloride to prevent a divalent metal ion content of about 11,300 ppm. In carrying out the brine stability experiments, the above-described dodecylmethyl-, tetradecylmethyl-, and hexadecylhydroxyethyl-sulfonium propane sulfonates were dissolved in the 6.6 and 16.6 brines and aged for periods of up to two months at temperatures of 20° to 65° C. In each case, the surfactants tested were solubilized in the brine solutions in concentrations of about 2.5 weight percent without any evidence of precipitation over the aging periods.

The interfacial activity of the amphoteric sulfonium surfactants is illustrated by the interfacial tensions observed for aqueous solutions of the above-identified surfactants against a crude oil. The aqueous phase in this experimental work was the 16.6 percent brine described previously. The interfacial tension measurements were taken by the spinning drop procedure at room temperature.

In one experiment, hexadecylhydroxyethylsulfonium propane sulfonate was added to the brine to provide a surfactant concentration of 100 ppm. The interfacial tension of the surfactant solution against the crude oil was 0.152 dyne per centimeter as measured at a spinning time of 30 minutes.

In another experiment, tetradecylmethylsulfonium propane sulfonate was added to the 16.6 percent brine to provide a surfactant concentration of 50 ppm. The interfacial tensions observed over a spinning time range of 32 minutes to 320 minutes are set forth in Table I. A similar set of interfacial tension measurements were taken for 50 ppm of dodecylmethylsulfonium propane sulfonate in the 16.6 percent brine and the results observed for spinning times ranging from 60 minutes to 325 minutes are set forth in Table II.

TABLE I

| Spinning Time (minutes) | Interfacial Tension (dyne/centimeter) |
|---|---|
| 32 | 0.167 |
| 103 | 0.112 |
| 210 | 0.097 |
| 270 | 0.082 |
| 320 | 0.077 |

TABLE II

| Spinning Time (minutes) | Interfacial Tension (dyne/centimeter) |
|---|---|
| 60 | 0.0098 |
| 70 | 0.0046 |
| 90 | 0.0029 |
| 110 | 0.0017 |
| 180 | 0.0015 |
| 210 | 0.0011 |
| 262 | 0.00078 |
| 325 | 0.00072 |

In a preferred embodiment of the invention, the amphoteric surfactant employed is a sulfonium propane sulfonate characterized by the formula:

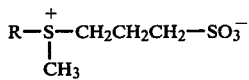

$$R-\overset{+}{\underset{CH_3}{S}}-CH_2CH_2CH_2-SO_3^- \qquad (3)$$

wherein R is a hydrocarbon group containing from 10 to 18 carbon atoms. Preferably the lipophilic base is provided by a $C_{10}$–$C_{14}$ aliphatic group. However, R may take the form of an aliphatic-substituted aryl radical as described previously. Thus the lipophilic base may be provided by an alkylbenzyl radical containing from 8 to 12 aliphatic carbon atoms. In a further embodiment of the invention, the amphoteric surfactant employed is a hydrocarbon ethoxysulfonium propane sulfonate characterized by the formula:

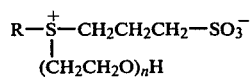

$$R-\overset{+}{\underset{(CH_2CH_2O)_nH}{S}}-CH_2CH_2CH_2-SO_3^- \qquad (4)$$

wherein:
R is a hydrocarbon group containing from 10 to 18 carbon atoms, and
n is a number within the range of 1 to 5.

For the surfactant characterized by the formula (4), R preferably is a $C_{10}$–$C_{14}$ aliphatic group in the case where n is 1 or 2. For derivatives having a higher ethylene oxide content, the hydrocarbon chain length of the radical R may likewise increase, in order to provide the proper hydrophobe-hydrophile balance.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al. Other well arrangements may be used in carrying out the present invention, examples of which are set forth in the Burdyn et al. patent. By the term "pore volume" as used herein is meant that volume of the portion of the formation underlying the well pattern employed, as described in greater detail in the Burdyn et al. patent.

The present invention may be carried out in conjunction with the use of a thickening agent added for mobility control purposes. The thickening agent may be added to the aqueous solution of the amphoteric surfactant or, where a relatively small surfactant slug is employed, it may be injected in a separate mobility control slug. Where a separate mobility control slug is employed, it normally will be injected immediately after the slug containing the surfactant. The thickening agent may be added in concentrations so as to provide a graded viscosity at the trailing edge of the mobility control slug as disclosed in the aforementioned paper by Foster or graded viscosities at both the leading and trailing edges of the mobility control slug as disclosed in U.S. Pat. No. 4,018,281 to Chang. Alternatively, the thickening agent concentration may be relatively constant throughout. Normally, the viscosity of at least a portion of the mobility control slug should be at least as great as that of the reservoir oil and typically it will be within the range of about 1 to 4 times the viscosity of the reservoir oil. Various thickening agents which may be employed for mobility control purposes are well known to those skilled in the art and include such polymers as Polysaccharide B-1459 available from the Kelco Company under the trade name "Kelzan" and the various partially hydrolyzed polyacrylamides available from the Dow Chemical Company under the trade name "Pusher" chemicals.

In view of the compatibility of the amphoteric surfactants used in the present invention with divalent metal ions, a preferred application of the invention is in reservoirs in which the connate water contains significant divalent metal ion concentrations and in situations where the available flooding medium contains divalent metal ions inconsistent with the use of conventional anionic surfactants such as petroleum sulfonates. Thus, a preferred application of the present invention is in those situations in which the reservoir waters and/or the waters employed in formulating the flooding medium exhibit a divalent metal ion concentration of at least 0.1 weight percent. A similar consideration applies with regard to those situations in which the reservoir waters and/or injection waters exhibit moderate to relatively high salinities even though the divalent metal ion concentration may be relatively low. Thus, another application of the invention is in those situations in which the reservoir waters and/or injection waters have salinities of at least 5.0 weight percent, whether provided by monovalent salts such as sodium chloride or monovalent salts and divalent salts such as calcium or magnesium chloride.

The amphoteric surfactants may be employed in accordance with the present invention in any suitable concentration depending upon the characteristics of the particular reservoir involved and such factors as surfactant consumption, e.g. by adsorption, and dispersion of the surfactant into the reservoir water. In view of the interfacial tensions achieved with low surfactant concentrations, a preferred mode of carrying out the present invention is to employ a relatively large volume of aqueous solution containing the surfactant in a relatively low concentration. More specifically, in this embodiment of the invention, the aqueous solution contains the amphoteric surfactant in a concentration within the range of 0.001–0.1, and more preferably within the range of 0.001–0.05 weight percent. When using such low surfactant concentrations, it is preferred to inject the surfactant solution in an amount of at least 0.5 pore volume in order to accommodate surfactant consumption within the reservoir. The surfactant solution may be the sole fluid injected in which case it will be employed in an amount, normally 1.0 to 2.0 pore volumes, as is necessary to carry the recovery project to its conclusion, or lesser amounts of surfactant solution may be employed and the recovery process carried to conclusion by a driving fluid. In this application of the invention, a portion of the surfactant solution may contain a thickening agent for mobility control purposes as described previously. Thus, an initial portion of the surfactant solution may be injected without thickening agent and the thickening agent then added to a subsequent portion of the surfactant solution in any of the mobility control configurations described previously.

The present invention may also be carried out employing a traditional injection format in which a more concentrated surfactant solution is injected in a limited amount. In this regard it will be recalled that the amphoteric surfactants tested for brine stability remained in solution at concentrations of up to 2.5 weight percent. Thus, a surfactant slug containing the amphoteric surfactant in an amount within the range of 0.1 to 2.5 weight percent may be injected in an amount within the range of 0.05–0.3 pore volume. Thereafter, a mobility control slug normally will be injected followed by a driving fluid injected in such amount as necessary to carry the process to completion.

I claim:

1. In a method for the recovery of oil from a subterranean oil reservoir penetrated by spaced injection and production systems in which an aqueous liquid is introduced into said reservoir via said injection system to displace oil to said production system, the improvement comprising employing as at least a portion of the fluid introduced into said injection system an aqueous liquid containing a water-soluble amphoteric surfactant characterized by the formula

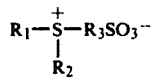

wherein:
$R_1$ is a hydrocarbon group containing from 8 to 24 carbon atoms,
$R_2$ is a hydrocarbon group containing from 1 to 4 carbon atoms or an alkoxy group containing from 2 to 10 carbon atoms and having a ratio of carbon atoms to oxygen atoms within the range of 2 to 3, and
$R_3$ is an aliphatic group containing from 1 to 4 carbon atoms.

2. The method of claim 1 wherein said aqueous liquid contains said amphoteric surfactant in a concentration within the range of 0.001 to 0.1 weight percent.

3. The method of claim 2 wherein said aqueous liquid containing said amphoteric surfactant is injected in an amount of at least 0.5 pore volume.

4. The method of claim 3 wherein the concentration of said amphoteric surfactant is within the range of 0.001 to 0.05 weight percent.

5. The method of claim 1 wherein said subterranean oil reservoir contains water having a divalent metal ion concentration of at least 0.1 weight percent.

6. The method of claim 1 wherein $R_1$ is an aliphatic group containing from 8 to 18 carbon atoms.

7. The method of claim 1 wherein $R_1$ is an aliphatic group containing from 10 to 12 carbon atoms.

8. The method of claim 7 wherein $R_2$ is a methyl or ethyl group and $R_3$ is an aliphatic group containing 2 or 3 carbon atoms.

9. In a method for the recovery of oil from a subterranean oil reservoir penetrated by spaced injection and production systems in which an aqueous liquid is introduced into said reservoir via said injection system to displace oil to said production system, the improvement comprising employing as at least a portion of the fluid introduced into said injection system an aqueous liquid containing a water-soluble amphoteric surfactant characterized by the formula

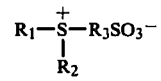

wherein:
$R_1$ and $R_2$ are hydrocarbon groups containing at least 6 carbon atoms and at least 4 carbon atoms, respectively, and containing in combination a total number of carbon atoms within the range of 10 to 24, and
$R_3$ is an aliphatic group containing from 1 to 4 carbon atoms.

10. The method of claim 9 wherein said subterranean oil reservoir contains water having a divalent metal ion concentration of at least 0.1 weight percent.

11. The method of claim 9 wherein $R_1$ and $R_2$ are aliphatic groups containing in combination a total number of carbon atoms within the range of 10 to 20.

12. The method of claim 11 wherein $R_3$ is an aliphatic group containing 2 or 3 carbon atoms.

13. The method of claim 12 wherein $R_1$ and $R_2$ are aliphatic groups containing in combination a total number of carbon atoms within the range of 10 to 16.

14. The method of claim 9 wherein said aqueous liquid contains said amphoteric surfactant in a concentration within the range of 0.001 to 0.1 weight percent.

15. The method of claim 14 wherein said aqueous liquid containing said amphoteric surfactant is injected in an amount of at least 0.5 pore volume.

16. The method of claim 15 wherein the concentration of said amphoteric surfactant is within the range of 0.001 to 0.05 weight percent.

17. In a method for the recovery of oil from a subterranean oil reservoir penetrated by spaced injection and production systems in which an aqueous liquid is introduced into said reservoir via said injection system to displace oil to said production system, the improvement comprising employing as at least a portion of the fluid introduced into said injection system an aqueous liquid containing a water-soluble amphoteric surfactant characterized by the formula

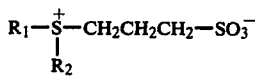

wherein:
R$_1$ is a hydrocarbon group containing from 10 to 18 carbon atoms, and
R$_2$ is —CH$_3$ or —(CH$_2$CH$_2$O)$_n$H and n is a number within the range of 1 to 5.

18. The method of claim 17 wherein said subterranean oil reservoir contains water having a divalent metal ion concentration of at least 0.1 weight percent.

19. The method of claim 17 wherein R$_1$ is an aliphatic group containing from 10 to 14 carbon atoms.

20. The method of claim 19 wherein R$_2$ is —CH$_3$.

21. The method of claim 19 wherein R$_2$ is —CH$_2$CH$_2$OH or —(CH$_2$CH$_2$O)$_2$H.

22. The method of claim 17 wherein said aqueous liquid contains said amphoteric surfactant in a concentration within the range of 0.001 to 0.1 weight percent.

23. The method of claim 22 wherein said aqueous liquid containing said amphoteric surfactant is injected in an amount of at least 0.5 pore volume.

24. The method of claim 23 wherein the concentration of said amphoteric surfactant is within the range of 0.001 to 0.05 weight percent.